United States Patent
Kato (10) Patent No.: US 6,822,666 B2
(45) Date of Patent: Nov. 23, 2004

(54) MULTIBEAM SCANNING OPTICAL APPARATUS AND COLOR IMAGE-FORMING APPARATUS

(75) Inventor: Manabu Kato, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/522,294

(22) Filed: Mar. 9, 2000

(65) Prior Publication Data
US 2003/0128270 A1 Jul. 10, 2003

(30) Foreign Application Priority Data
Mar. 12, 1999 (JP) .......................... 11-066536
Mar. 8, 2000 (JP) ........................ 2000-063399

(51) Int. Cl.⁷ .............................. B41J 2/435; B41J 2/47
(52) U.S. Cl. ....................... 347/235; 347/250
(58) Field of Search ............. 347/229, 234, 347/235, 248, 250, 256, 241, 244, 258, 137, 259; 250/235, 236, 234; 359/205, 204, 210

(56) References Cited

U.S. PATENT DOCUMENTS

| | | | | |
|---|---|---|---|---|
| 4,424,442 A | * | 1/1984 | Kitamura ............ | 250/236 |
| 4,862,196 A | | 8/1989 | Umeda et al. ....... | 347/232 |
| 4,878,066 A | * | 10/1989 | Shiraishi ............ | 347/235 |
| 4,950,889 A | * | 8/1990 | Budd et al. ......... | 250/236 |
| 4,978,975 A | * | 12/1990 | Saito .................. | 347/259 |
| 4,978,977 A | * | 12/1990 | Ohmori et al. ..... | 347/258 |
| 5,182,575 A | | 1/1993 | Kato et al. .......... | 346/107.1 |
| 5,365,259 A | * | 11/1994 | Kanoto et al. ...... | 347/137 |
| 5,436,645 A | | 7/1995 | Uemura et al. ..... | 347/240 |
| 5,557,446 A | | 9/1996 | Kato .................. | 359/206 |
| 5,606,449 A | * | 2/1997 | Nishiyama .......... | 359/210 |
| 5,872,586 A | | 2/1999 | Shio ................... | 347/116 |
| 5,952,650 A | * | 9/1999 | Uzuki ................. | 250/235 |
| 5,963,356 A | | 10/1999 | Kato .................. | 359/216 |
| 5,966,161 A | | 10/1999 | Kato .................. | 347/258 |
| 5,995,131 A | | 11/1999 | Fujibayashi et al. | 347/258 |
| 6,031,561 A | | 2/2000 | Narayan et al. .... | 347/255 |
| 6,038,053 A | | 3/2000 | Kato .................. | 359/205 |
| 6,124,962 A | * | 9/2000 | Kamikubo .......... | 359/205 |
| 6,178,029 B1 | * | 1/2001 | Kamikubo .......... | 359/204 |

FOREIGN PATENT DOCUMENTS

| | | |
|---|---|---|
| DE | 198 17 591 | 10/1998 |
| EP | 0 898 415 | 2/1999 |

* cited by examiner

Primary Examiner—Hai Pham
(74) Attorney, Agent, or Firm—Fitzpatrick, Cella, Harper & Scinto (57) ABSTRACT

A multibeam scanning optical apparatus having a light source, an optical deflector, a scanning optical system, a detection optical element, and a photodetector. A plurality of light beams modulated in accordance with information signals are emitted from the light source and lead to the optical deflector. The light beams deflected by the optical deflector are then focussed on a surface to be scanned, typically a photosensitive drum, by way of the scanning optical system having an fθ characteristic. Part of the deflected light beams are lead to the photodetector by a way of the detection optical system in order to control the timing of the start of scanning so that the centers of the scanning areas of the plurality of light beams agree with each other on the surface to be scanned.

16 Claims, 7 Drawing Sheets

○ FOCUSSING POSITION OF LASER A
◉ FOCUSSING POSITION OF LASER B

FIG. 4 PRIOR ART

○ FOCUSSING POSITION OF B (BLACK)
◉ FOCUSSING POSITION OF C (CYAN)

MULTIBEAM SCANNING OPTICAL APPARATUS AND COLOR IMAGE-FORMING APPARATUS

BACKGROUND OF THE INVENTION

1. Field of the Invention

This invention relates to a multibeam scanning optical apparatus and also to a color image-forming apparatus. A multibeam scanning optical apparatus is an apparatus adapted to optically scan the surface of an object by means of a plurality of light beams that are emitted from one or more than one light sources, deflected by an optical deflector and transmitted by way of a scanning optical system having an fθ characteristic. A color image-forming apparatus is an apparatus adapted to record image information obtained by scanning the surface of an image carrier by means of deflected light. Such apparatus find applications in the field of laser beam printers (LBPs) and digital copying machines having a feature of carrying out a color electrophotography process.

2. Related Background Art

In conventional scanning optical apparatus to be used for image-forming apparatus such as laser beam printers and digital copying machines, the light beam emitted from a light source and optically modulated according to the image signal applied to it is periodically deflected by a light deflector typically comprising a rotary polygon mirror and then focussed on the surface of a photosensitive recording medium (photosensitive drum) to produce a spot of light there by means of a focussing optical system having an fθ characteristic, which optical system is then used to scan the surface of the-recording medium and record the image on the recording medium.

Figure 1:
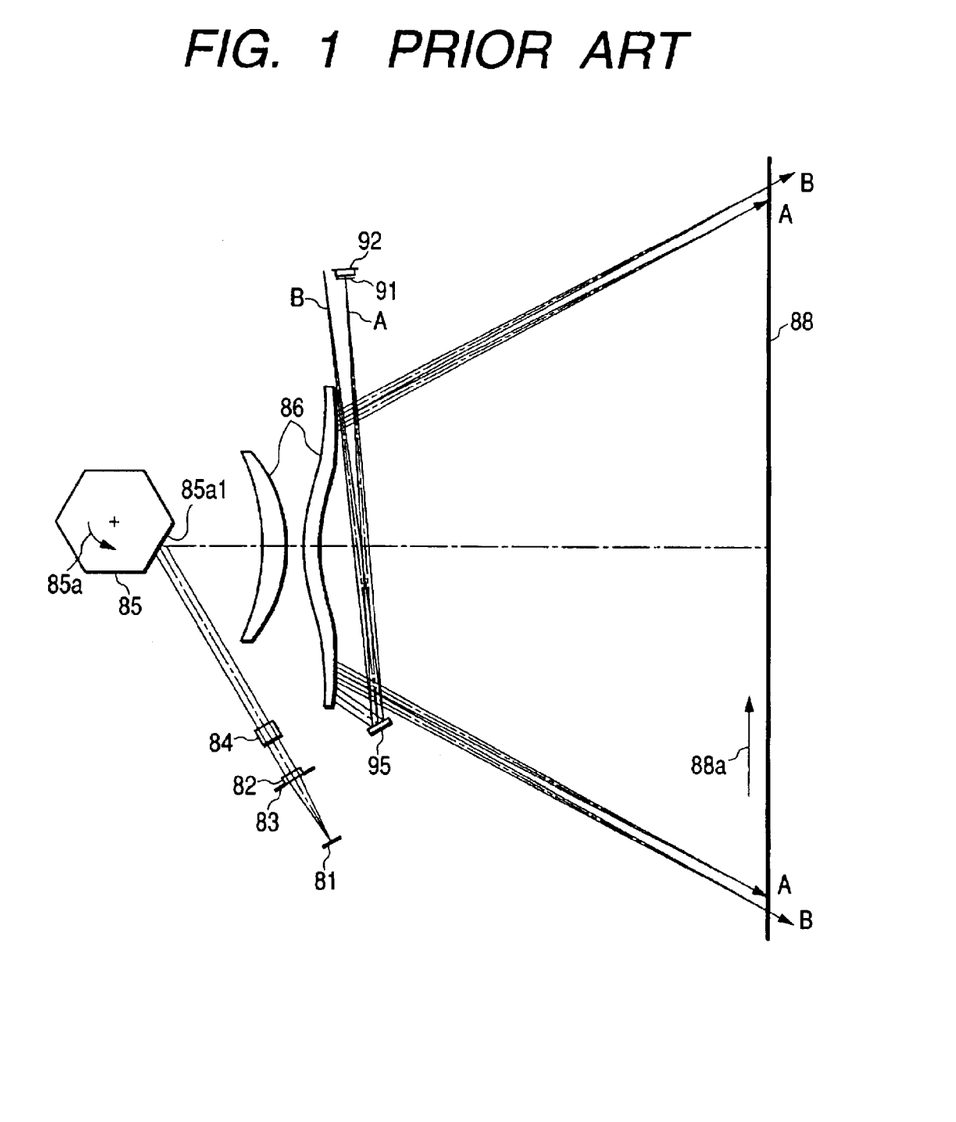
FIG. 1 is a schematic illustration of a principal portion of a known scanning optical apparatus.

FIG. 1 of the accompanying drawings schematically illustrates a principal portion of a known scanning optical apparatus.

Referring to FIG. 1, a divergent light beam emitted from light source 81 is substantially collimated by a collimator lens 82 and restricted for quantity by a diaphragm 83 before it enters a cylindrical lens 84 that is made to have a predetermined refractive power only in the sub-scanning direction. The substantially collimated light beam entering the cylindrical lens 84 is then made to exit the lens as a beam substantially collimated in the main-scanning plane, while it is converged in the sub-scanning plane to produce a linear image on the deflection plane (reflection plane) 85a1 of a light deflector 85 comprising a rotary polygon mirror.

Then, the light beam deflected and reflected by the deflection plane 85a1 of the light deflector 85 is led to the surface 88 of a photosensitive drum to be scanned by way of a scanning optical element having an fθ characteristic (fθ lens) 86 so that the surface 88 of the photosensitive drum is optically scanned in the direction indicated by arrow 88a (main-scanning direction) to record the scanned image as the light deflector 85 is driven to rotate in the sense of arrow 85a.

In order to accurately control the starting point of the operation of drawing the image for the scanning optical apparatus, the light beam deflected by the light deflector 85 is partly taken out and entered to beam detector (BD) sensor 92 by way of the scanning optical element 86, a beam detector (BD) mirror 95 and a slit 91 immediately prior to the start of writing the image signal. Then, the output signal of the beam detector (BD) sensor 92 is used to regulate the timing and the spot at which the operation of drawing the image on the surface of the photosensitive drum is started.

Figure 2:
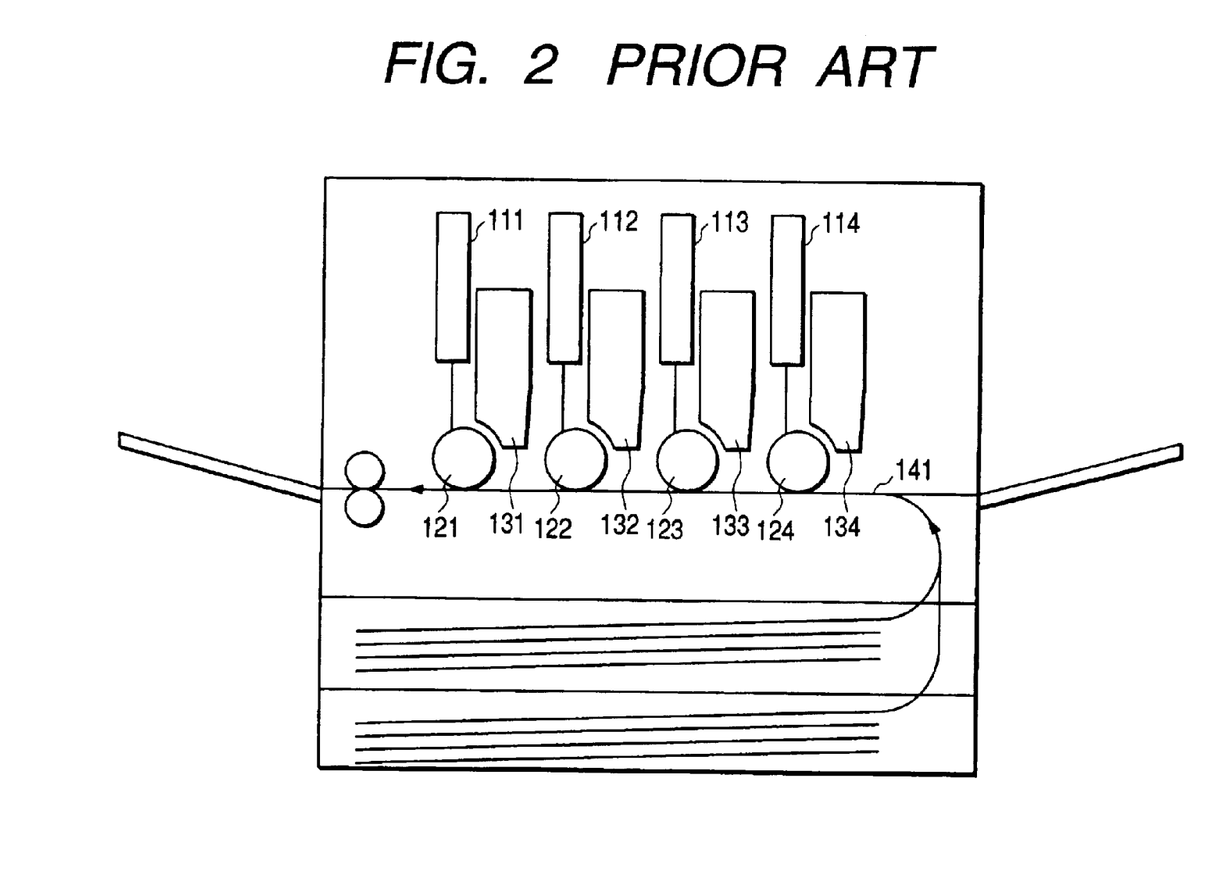
FIG. 2 is a schematic illustration of a principal portion of a known tandem type color image forming apparatus.

In recent years, as a result of technological development in the field of image forming apparatus involving the use of an electrophotography process particularly in terms of high speed and high resolution, there is an ever-increasing demand for multibeam scanning optical apparatus comprising a multibeam laser device having a plurality of light emitting sections and scanning optical apparatus of the type employing a plurality of scanning optical apparatus as so many units in order to realize high speed color image formation as shown in FIG. 2 that illustrates a tandem type color image forming apparatus where a plurality of scanning optical apparatus are operated simultaneously for different colors in order to record image information on respective photosensitive drums as well as hybrid type color image forming apparatus realized by combining apparatus of the above identified types. In FIG. 2, reference numerals 111, 112, 113 and 114 denote respective scanning optical apparatus and reference numerals 121, 122, 123 and 124 denote respective photosensitive drums operating as so many image carriers, whereas reference numerals 131, 132, 133 and 134 denote respective developing units and reference numeral 141 denotes a conveyor belt.

Since the manufacturing cost of such scanning optical apparatus is vital, the scanning optical element (fθ lens) is typically prepared by plastic molding without the process of compensating, if any, the chromatic aberration of magnification.

However, in the case of a multibeam scanning optical apparatus adapted to form a final image by means of light beams of a multibeam laser having a plurality of light emitting sections, the plurality of light beams can show discrepancies in terms of magnification to consequently degrade the quality of the produced image due to various factors including those listed below:

(1) variances of the initial wavelengths of a plurality of light beams emitted from the multibeam laser;
(2) variances of the wavelength of the plurality of light beams caused by mode hopping of the multibeam laser that is attributable to environmental changes; and
(3) fluctuations in the refractive index of the plastic lens also attributable to environmental changes.

In FIG. 1, there are also shown the image region of the known scanning optical apparatus and the displacements of the focussing positions of the light beams as detected at the start of drawing the image when the wavelength of the light source of laser B (as observed by the laser beam emitted from the light source) is modified relative to the wavelength of the light source of the laser A. Note that, while only the focussing points of laser A and laser B are indicated by A and B respectively in FIG. 1, there are actually more focussing points that are not illustrated in FIG. 1.

Figure 3:
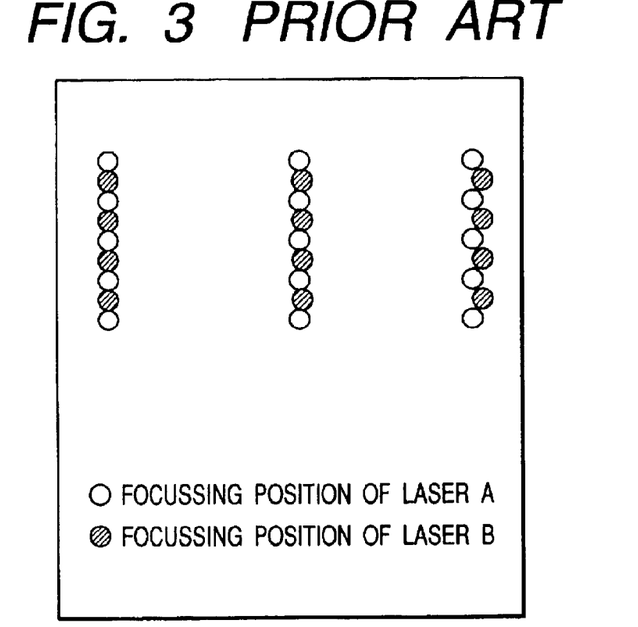
FIG. 3 is a schematic illustration of a surface being scanned by a known scanning optical apparatus, showing some focussing positions.

In an actual image, the displacements of focussing positions on the surface being scanned due to variations of magnification (wavelength) do not give rise to any jittering along the left edge of the image but they do along the right edge of the image as shown in FIG. 3 to consequently degrade the recorded image. This is because the timing and the spot at which the operation of drawing the image on the surface of the photosensitive drum is started are regulated (synchronized) at the side of starting the scanning operation as pointed out above. More specifically, referring to FIG. 1, the detection light beam to be detected by the BD sensor 92 of the known scanning optical apparatus strikes aslant the fθ lens 86 shared with the light beams for scanning the surface to be scanned and, if the wavelength of the laser beam emitted from the laser A differs from that of the light beam emitted from the laser B, they produce a relative deviation of the focussing positions equal to that of the starting points of scanning the surface to be scanned. Thus, the starting points of scanning of the light beams can be made to agree with each other by detecting a part of each of the light beams and so controlling the scanning timing of the beam as to correct the relative deviation of the focussing positions due to the difference of the wavelengths on the basis of the signals obtained by detecting the laser beams. However, it will be appreciated that, as a result, a remarkable jittering phenomenon can appear at the terminating points of scanning.

Figure 4:
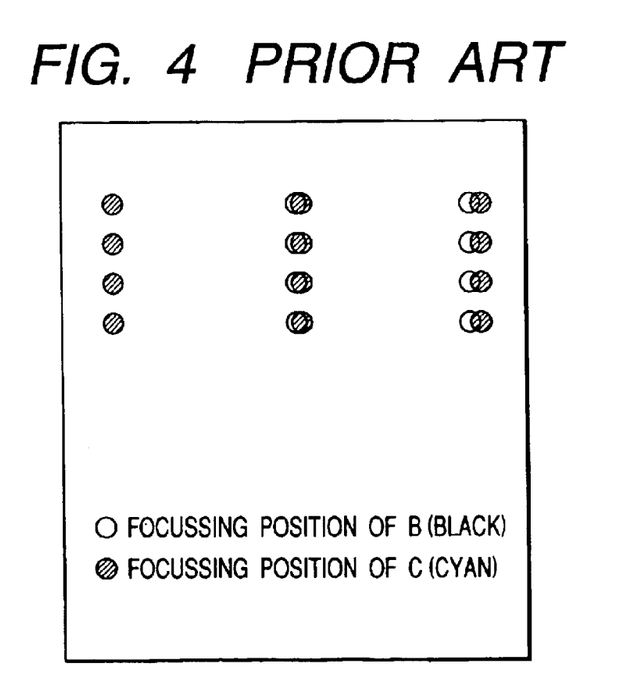
FIG. 4 is a schematic illustration of a surface being scanned by a known tandem type color image forming apparatus, showing some focussing positions.

A similar problem arises in the scanning optical apparatus of tandem type color image forming apparatus. More specifically, when magnification discrepancies arises among a number of scanning optical apparatus, a relative deviation of registration occurs over the range from the center toward the right edge of the image as shown in FIG. 4 among different colors to consequently degrade the produced image. While FIG. 4 shows a relative deviation of registration between B (black) and C (cyan), a similar deviation can occur among any different colors.

SUMMARY OF THE INVENTION

In view of the above identified circumstances, it is therefore the first object of the present invention to provide a multibeam scanning optical apparatus that can effectively reduce jittering that can arise due to variations (deviations) of magnification among a plurality of light beams attributable to the difference of initial wavelength (wavelength deviation) among the plurality of light beams emitted from so many light emitting sections and environmental changes even when a molded plastic lens is used without being subjected to a process of correcting the chromatic aberration of magnification.

The second object of the present invention is to provide a color image forming apparatus having a simple configuration and free from the above pointed out problem of tandem type color image forming apparatus that a relative deviation of registration arises among different colors (color deviation) due to the difference of initial wavelength among the plurality of light beams emitted from so many scanning optical apparatus light emitting sections and environmental changes.

According to the invention, the above first object is achieved by providing a multibeam scanning optical apparatus comprising:

a light source having a plurality of light beam emitting sections;

a light deflector for deflecting a plurality of light beams emitted respectively from said plurality of light beam emitting sections of said light source;

a scanning optical system for focussing said plurality of light beams deflected by said light deflector on a surface to be scanned; and a photodetector for controlling the timing of the start of scanning of said plurality of light beams by detecting a part of at least one of said plurality of light beams deflected by said light deflector as detection light beam;

said timing of the start of scanning being so controlled as to make the centers of the scanning areas of said light beams agree with each other on the surface to be scanned when said plurality of light beams have respective wavelengths that are different from each other.

According to the invention, there is also provided a multibeam scanning optical apparatus comprising:

a light source having a plurality of light beam emitting sections;

a light deflector for deflecting a plurality of light beams emitted respectively from said plurality of light beam emitting sections of said light source;

a scanning optical system for focussing said plurality of light beams deflected by said light deflector on a surface to be scanned;

a photodetector for controlling the timing of the start of scanning of said plurality of light beams by detecting a part of at least one of said plurality of light beams deflected by said light deflector as detection light beam; and a detection optical element for converging said detection light beam and leading it to said photodetector;

said detection optical element having its optical plane arranged orthogonally relative to said detection light beam.

According to the invention, the above second object is achieved by providing a color image forming apparatus comprising:

a plurality of scanning optical apparatus, each having light source, a light deflector for deflecting a light beam emitted from said source, a scanning optical system for focussing the light beam deflected by said light deflector on a surface to be scanned and a photodetector for controlling the timing of the start of scanning of said light beam by detecting a part of said light beam deflected by said light deflector as detection light beam, said photodetector and the center of the scanning width in the main-scanning direction on the surface to be scanned being held optically equivalent; and a plurality of image carriers arranged respectively on the surfaces to be scanned of said scanning optical apparatus for forming images with respective different colors.

According to the invention, there is also provided a color image forming apparatus comprising:

a plurality of scanning optical apparatus, each having light source, a light deflector for deflecting a light beam emitted from said source, a scanning optical system for focussing the light beam deflected by said light deflector on a surface to be scanned, a photodetector for controlling the timing of the start of scanning of said light beam by detecting a part of said light beam deflected by said light deflector as detection light beam and a detection optical element for converging said detection light beam and leading it to said photodetector, said detecting optical element having its optical plane arranged orthogonally relative to said detection light beam; and a plurality of image carriers arranged respectively on the surfaces to be scanned of said scanning optical apparatus for forming images with respective different colors.

When the plurality of light beams show respective wavelengths that are different from each other in a multibeam optical apparatus according to the invention, the timing of the start of scanning is so controlled as to make the centers of the scanning areas of said light beams agree with each other on the surface to be scanned simply by controlling the timing of scanning in the main-scanning direction at or near the center of the scanning width in the main-scanning direction on the surface to be scanned by means of the photodetector (BD) sensor. This means that the photodetector and the center of the scanning width in the main-scanning direction on the surface to be scanned are held optically equivalent. Similarly, in each of the scanning optical apparatus of a color image forming apparatus according to the invention, the timing of the start of scanning is so controlled as to make the centers of the scanning areas of said light beams agree with each other on the surface to be scanned simply by controlling the timing of scanning in the main-scanning direction at or near the center of the scanning width in the main-scanning direction on the surface to be scanned by means of the photodetector (BD) sensor.

The photodetector and the center of the scanning width in the main-scanning direction on the surface to be scanned can be held optically equivalent by so arranging the detecting optical element for focussing the detection light beam and leading it to the photodetector (BD) sensor as to have its optical plane arranged orthogonally relative to said detection light beam. This is because the main light beam of the flux of light striking the center of the scanning width in the main-scanning direction generally agrees with the optical axis of the scanning optical system (fθ lens) and hence this light beam and the light beam entering the photodetector (BD) sensor are made to optically equivalent.

For the purpose of the invention, the expression that "the detecting optical element having its optical plane arranged orthogonally relative to the detection light beam" means that the main light beam of the flux of light as detected by the photodetector (BD) sensor substantially agrees with the optical axis of the detecting optical element. The expression "as detected by the photodetector" is used because the light beam entering the photodetector is used for scanning and therefore the main light beam of the flux of light does not always agree with the optical axis of the detecting optical element. In other words, there exists a state where the main light beam of the flux of light being used for scanning can agree with optical axis of the detecting optical element.

DESCRIPTION OF THE PREFERRED EMBODIMENTS

Now, the present invention will be described in greater detail by referring to the accompanying drawings that illustrate preferred embodiments of the invention.

Embodiment 1

Figure 5:
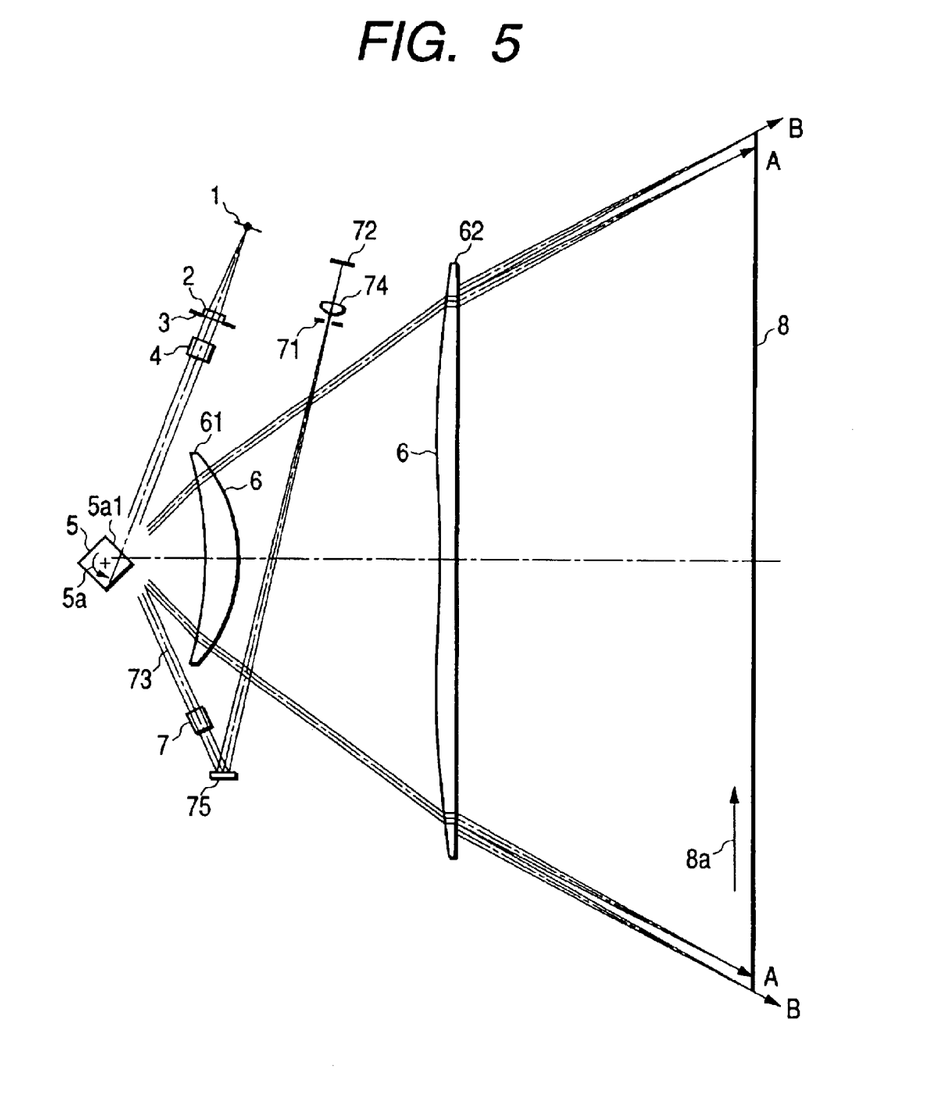
FIG. 5 is a schematic cross sectional view of a principal portion of the first embodiment of multibeam scanning optical apparatus according to the invention taken along the main-scanning direction thereof.

FIG. 5 is a schematic cross sectional view of a principal portion of the first embodiment of multibeam scanning optical apparatus according to the invention taken along the main-scanning direction thereof.

In FIG. 5, reference numeral 1 denotes a light source comprising a multi-semiconductor laser (multibeam laser) having a plurality of light emitting sections (laser A and laser B in this embodiment) for emitting a plurality of light beams that are optically modulated independently.

Reference numeral 2 denotes a collimator lens operating as first optical element for collimating the plurality of light beams emitted from the light source 1. Reference numeral 3 denotes a diaphragm 3 for restricting the quantity of light passing therethrough. Reference numeral 4 denotes a cylindrical lens (cylinder lens) operating as second optical element and showing refractive power of a predetermined level only in the sub-scanning direction. It focusses, in the direction of the sub-scanning plane, the plurality of light beams passing through the diaphragm 3 on the deflection plane (reflection plane) 5a1 of optical deflector 5, which will be described below, as a linear image.

Reference numeral 5 denotes an optical deflector that may be a rotary polygon mirror driven to rotate at a predetermined rate in the sense indicated by arrow 5a in FIG. 5 by a drive means (not shown) such as an electric motor.

Reference numeral 6 denotes a scanning optical element operating as third optical element showing a fθ characteristic and comprising a refraction optical element 61 and a diffraction optical element 62. The refraction optical element 61 consists of a single plastic toric lens whose optical power differs between the main-scanning direction and the sub-scanning direction. The diffraction optical element 62 consists of an oblong plastic diffraction element whose optical power differs between the main-scanning direction and the sub-scanning direction. While the oblong diffraction element 62 of this embodiment is made of plastic and formed by injection molding, it may alternatively be a diffraction grating formed as replica on a glass substrate.

In this embodiment, the toric lens 61 is arranged at the side of the polygon mirror 5 relative to the middle point of the axis of rotation of the polygon mirror 5 and the surface to be scanned 8, whereas the diffraction optical element 62 is arranged at the side of the surface to be scanned relative to the middle point. Each of the above listed optical elements has optical power that differs between the main-scanning direction and the sub-scanning direction and operates to focus the deflected light beam from the polygon mirror 5 on the surface to be scanned and correct the inclination of the deflection plane of the polygon mirror. When the multibeam scanning optical apparatus is applied to an electronic photograph printer, the surface to be scanned 8 refers to the surface of the photosensitive drum of the printer. Therefore, reference numeral 8 refers to the surface of a photosensitive drum hereinafter.

Reference numeral 7 denotes a synchronism detecting optical element comprising an anamorphic lens made of plastic and showing optical power that differs between the main-scanning direction and the sub-scanning direction. In this embodiment, the surfaces of the anamorphic lens 7 is arranged substantially orthogonally relative to the plurality of light beams from the polygon mirror 5 (synchronism detection light beams) 73 for controlling the timing of scanning the surface of the photosensitive drum 8 in the main-scanning direction (synchronizing timing) and adapted to focus the synchronism detection light beam 73 near slit 71 both in the main-scanning plane and the sub-scanning plane. Reference numeral 75 denotes a mirror (to be referred to as "BD mirror" hereinafter) for reflecting the synchronism detection light beams 73 to BD sensor 72, which will be described hereinafter, in order to regulate the timing of scanning the surface of the photosensitive drum 8 in the main-scanning direction. Reference numeral 71 denotes a slit arranged at a position equivalent to the surface of the photosensitive drum 8. Reference numeral 74 denotes a beam detector lens (BD lens) operating as focussing lens for making the BD mirror 75 and the BD sensor 72 show a conjugated relationship and correcting the inclination of the BD mirror 75. Reference numeral 72 denotes a synchronism detection means comprising the BD sensor (photosensor). The synchronism detection means 72 of this embodiment is used to control the timing of scanning of each of the plurality of light beams emitted from the plurality of light emitting sections in the main-scanning direction at or near the center of the scanning width on the surface of the photosensitive drum 8. In other words, if the plurality of light beams have respective wavelengths that are different from each other in this embodiment, the timing of starting a scanning operation of each light beam is so controlled that the centers of the scanning areas of the plurality of light beams agree with each other on the surface to be scanned.

In this embodiment, a pair of divergent light beams (only one of them is shown in FIG. 5) optically modulated and emitted from the multi-semiconductor laser 1 as a function of image information applied to it are substantially collimated by the collimator lens 2 and restricted by the diaphragm 3 for the quantity of light before entering the cylindrical lens 4. The two substantially collimated light beams entering the cylindrical lens 4 then leave the lens without being modified in the main-scanning plane but converged in the sub-scanning plane to produce respective focussed linear images (running along main-scanning direction) on the deflection plane 5a1 of the optical deflector (polygon mirror) 5. The two light beams deflected by the deflection plane 5a1 of the optical deflector 5 are then focussed as so many spots of light on the surface of the photosensitive drum 8 by way of the toric lens 61 and the refraction optical element 62 so that they scan the surface of the photosensitive drum 8 at a constant rate in the direction (main-scanning direction) as indicated by arrow 8a as the optical deflector 5 is rotated in the sense of arrow 5a. As a result, an image is recorded on the surface of the photosensitive drum 8, which is a recording medium.

At the same time, the two synchronism detection light beams 73 reflected and deflected by the polygon mirror 5 of this embodiment are led to the BD sensor 72 by way of the synchronism detecting optical element 7, the BD mirror 75, the slit 71 and the BD lens 74. Then, the two BD signals (synchronizing signals) for the main-scanning direction obtained by detecting the output signal of the BD sensor 72 are used to control the timing of scanning (synchronizing timing) in the main-scanning direction at or near the center of the scanning width in the main-scanning direction on the surface of the photosensitive drum 8.

As pointed out above, the surfaces of the single anamorphic lens 7 made of a plastic material and formed by injection molding is arranged substantially orthogonally relative to the synchronism detection light beams 73 in this embodiment. As a result, if, for instance, the wavelength of the light source of the laser B is shifted relative to the laser A of the multi-semiconductor laser 1 as shown in FIG. 5, the synchronism detection timing (write synchronizing signal) will not be shifted in the main-scanning direction. Note that only the focussed positions of the light beams from the lasers A and B are shown in FIG. 5.

On the other hand, because the timing of scanning is controlled in the main-scanning direction at or near the center of the scanning width in the main-scanning direction on the surface of the photosensitive drum 8, if the wavelength of the light source of the laser B is shifted relative to the laser A, the positions (focussed positions) of the light beams on the surface of the photosensitive drum 8 agree with each other only on the optical axis of the scanning optical element 6 and the magnification of the scanning optical element shows variations that are symmetrical relative to the optical axis in any other positions. Variations of the refractive index of the scanning optical element 6 due to environmental changes also show similar results.

Figure 6:
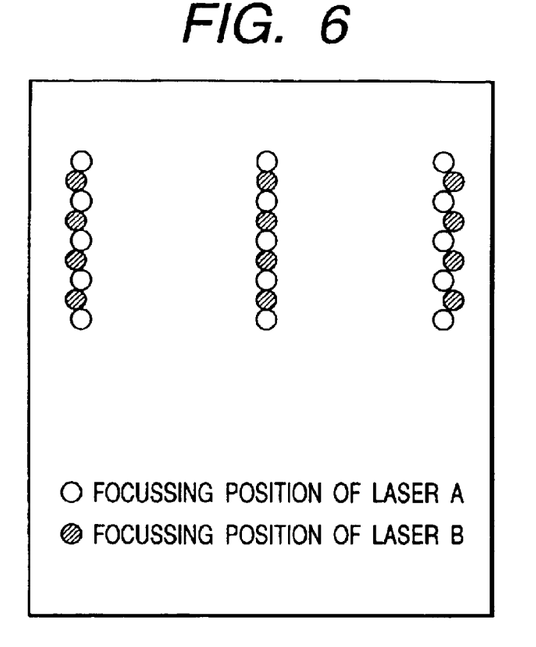
FIG. 6 is a schematic illustration of a surface being scanned by the first embodiment of multibeam scanning optical apparatus, showing some focussing positions.

Thus, in this embodiment, the synchronism detection timing does not shift regardless of variations in the wavelength and those in the refractive index due to environmental changes so that the focussing positions of the image area are made to vary symmetrically relative to the optical axis of the scanning optical element 6 as shown in FIG. 6. As a result, the variations in the magnification can be allocated to the starting side and the terminating side of image drawing to consequently reduce the extent of jittering to about a half of that of known comparable apparatus.

Therefore with the embodiment where the timing of scanning is controlled in the main-scanning direction at or near the center of the scanning width in the main-scanning direction on the surface of the photosensitive drum 8 and the surfaces of the single anamorphic lens 7 are arranged substantially orthogonally relative to the synchronism detection light beams 73, the jittering phenomenon of the multi-beam scanning optical apparatus attributable to variations in the wavelength (initial wavelength) and those in the magnification due to environmental changes can be effectively suppressed even an inexpensive plastic lens formed by injection molding and not corrected for chromatic aberration of magnification is used for the scanning optical element.

Note that the scanning optical element of this embodiment comprises a refraction optical element and a diffraction optical element, the advantages of the first embodiment can be realized by using a scanning optical element comprising only a refraction optical element.

Embodiment 2

Figure 7:
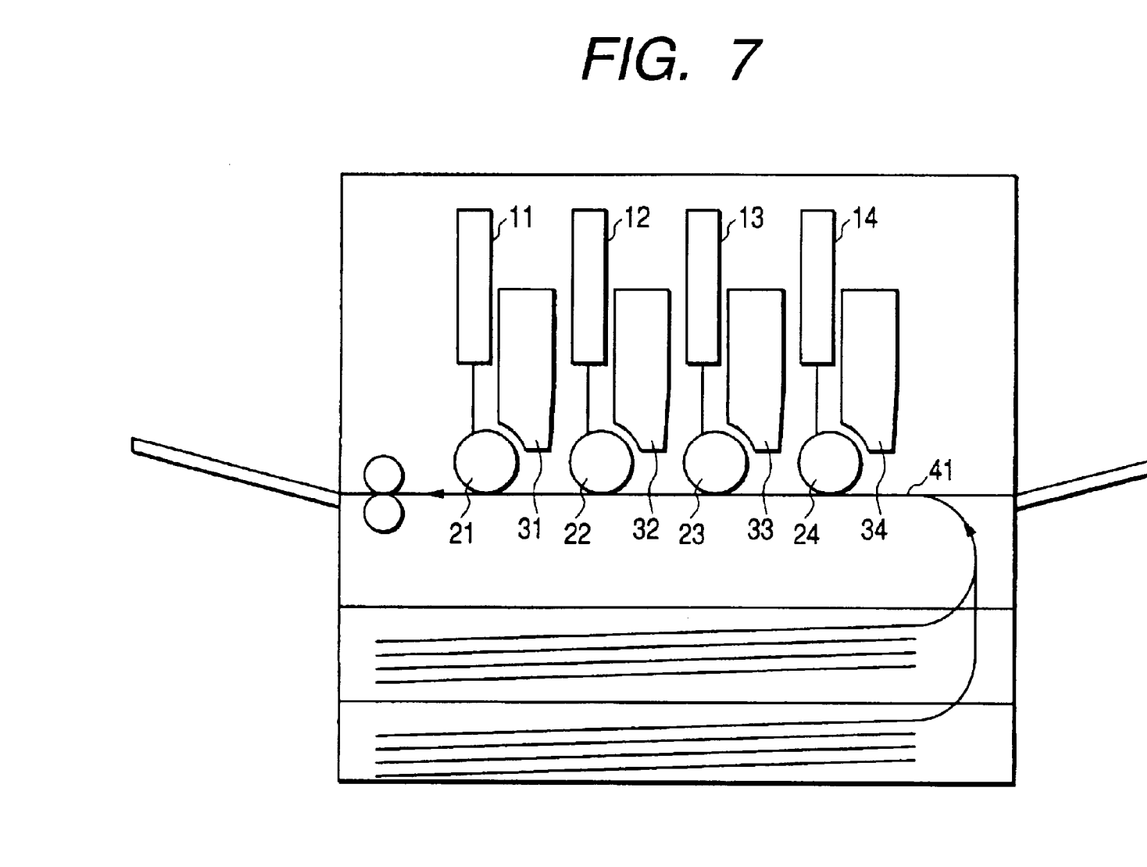
FIG. 7 is a schematic cross sectional view of a principal portion of the second embodiment of the invention, which is a color image forming apparatus, taken along the main-scanning direction thereof.

FIG. 7 is a schematic cross sectional view of a principal portion of the second embodiment of multibeam scanning optical apparatus according to the invention taken along the main-scanning direction thereof.

In FIG. 7, reference numerals 11, 12, 13 and 14 denote respective scanning optical apparatus and reference numerals 21, 22, 23 and 24 denote respective photosensitive drums operating as so many image carriers, whereas reference numerals 31, 32, 33 and 34 denote respective developing units and reference numeral 41 denotes a conveyor belt.

This embodiment of color image forming apparatus comprises a total of four scanning optical apparatus (11, 12, 13, 14) arranged for the four colors of C (cyan), M (magenta), Y (yellow) and B (black) and is adapted to record respective image signals (image information) on the corresponding photosensitive drums 21, 22, 23 and 24 in parallel and carry out a color image printing operation at high speed.

As pointed out above, the color image forming apparatus of this embodiment is adapted to form latent images on the corresponding surfaces of the respective photosensitive drums 21, 22, 23 and 24 by means of respective light beams emitted from the four scanning optical apparatus 11, 12, 13 and 14 according to respective modulation signals. More specifically, latent images of C (cyan), M (magenta), Y (yellow) and B (black) are formed on the corresponding surfaces of the respective photosensitive drums 21, 22, 23 and 24 and then transferred on a recording medium in a multiplexing fashion to produce a single full color image.

Thus, a color image can be printed at high speed as if a monochromatic image. However, since the four colors do not share a single scanning optical element in this embodiment, they can show variations in terms of scanning position (registration) to consequently produce a relative deviation of registration among different colors and degrade the produced image.

To avoid this problem, in this embodiment of a tandem type color image forming apparatus comprising a plurality of scanning optical apparatus, the timing of scanning of each of the scanning optical apparatus is controlled on the surface of the corresponding photosensitive drum at or near the center of the scanning width in the main-scanning direction in a manner as described above by referring to the first embodiment. In other words, the photodetector (BD) sensor and the center of the scanning width in the main-scanning direction on the surface to be scanned are optically held equivalent. To realize this, the surfaces of the synchronism detecting optical element (anamorphic lens) made of a plastic material and formed by molding as a single piece are arranged substantially orthogonally relative to the synchronism detection light beam in each of the scanning optical apparatus.

As a result, as described above by referring to the first embodiment, the timing of synchronism detection is not shifted if the wavelengths of the light sources of the four scanning optical apparatus are varied from each other. Similarly, the timing of synchronism detection is not shifted if the refractive index of any of the synchronism detecting optical elements is shifted due to environmental changes.

On the other hand, because the timing of scanning is controlled in the main-scanning direction at or near the center of the scanning width in the main-scanning direction on the surface of each of the photosensitive drums, if the wavelength of the light source of any of the four scanning optical apparatus is shifted relative to the others, the positions (focussed positions) of the light beams on the surface of the photosensitive drum agree with each other only on the optical axis of the scanning optical element and the magnification of the scanning optical element shows variations that are symmetrical relative to the optical axis at any other positions. Variations of the refractive index of the scanning optical element due to environmental changes also shows similar results.

Figure 8:
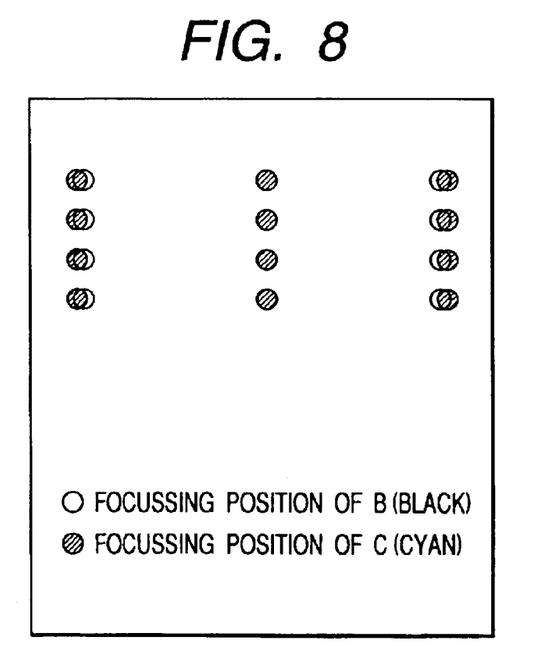
FIG. 8 is a schematic illustration of a surface being scanned by the second embodiment of color image forming apparatus, showing some focussing positions.

Thus, in this embodiment, the synchronism detection timing does not shift regardless of variations in the wavelength and those in the refractive index due to environmental changes so that the focussing positions of the image area are made to vary symmetrically relative to the optical axis of the scanning optical element as shown in FIG. 8. As a result, the variations in the magnification can be allocated to the starting side and the terminating side of image drawing to consequently reduce the extent of relative deviation of registration among different colors to about a half of that of known comparable apparatus. Note that while FIG. 8 shows color deviation between B (black) and C (cyan), similar results are obtained for other colors.

Therefore with the embodiment of scanning optical apparatus used for a tandem type color image forming apparatus where the timing of scanning is controlled in the main-scanning direction at or near the center of the scanning width in the main-scanning direction on the surface of the photosensitive drum and the surfaces of the single anamorphic lens are arranged substantially orthogonally relative to the synchronism detection light beams in each of the scanning optical apparatus, the extent of relative deviation of registration among different colors attributable to variations in the wavelength and those in the magnification due to environmental changes can be effectively suppressed even an inexpensive plastic lens formed by injection molding and not corrected for chromatic aberration of magnification is used for the scanning optical element.

Note that the scanning optical apparatus of this embodiment of color image forming apparatus may be replaced by the multibeam scanning optical apparatus as described above by referring to the first embodiment. Then, the obtained color image forming apparatus can be operated for an enhanced degree of high speed operation and high definition.

Embodiment 3

Figure 9:
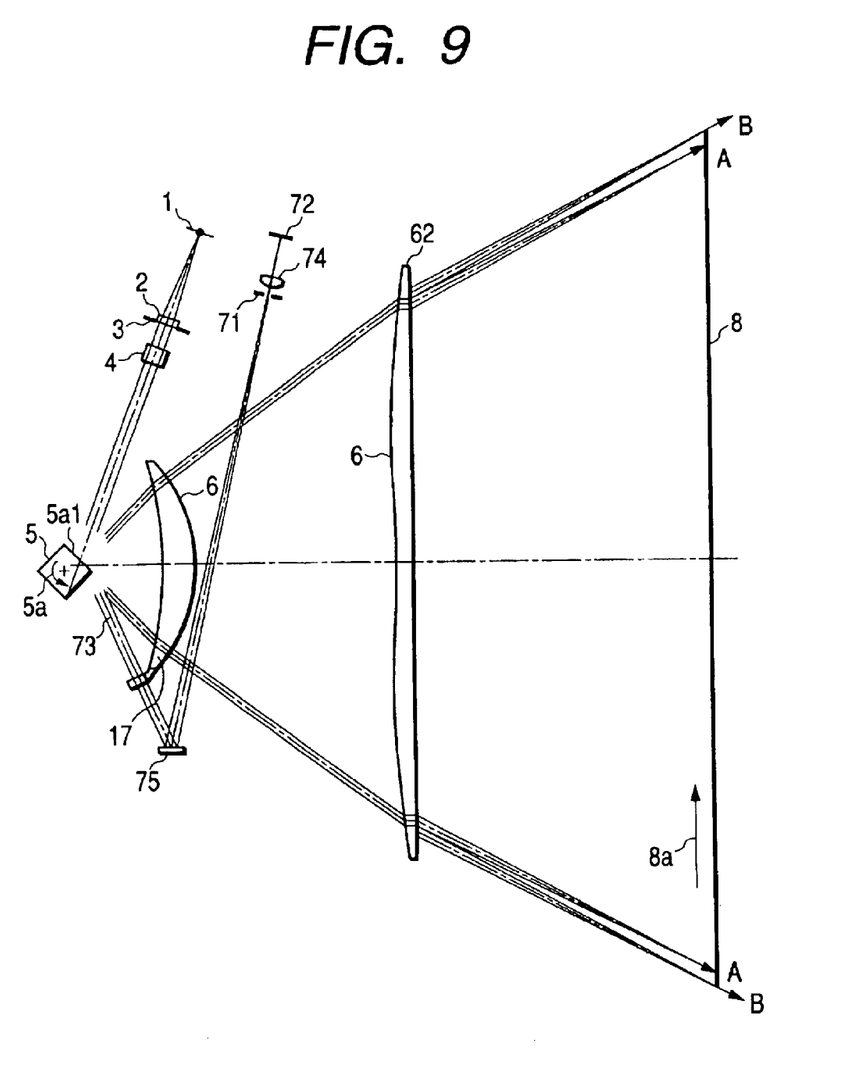
FIG. 9 is a schematic cross sectional view of a principal portion of the third embodiment of the invention, which is also a multibeam scanning optical apparatus, taken along the main-scanning direction thereof.

FIG. 9 is a schematic cross sectional view of a principal portion of the third embodiment of the invention, which is also a multibeam scanning optical apparatus, taken along the main-scanning direction thereof. In FIG. 9, the components same as those of FIG. 5 are denoted respectively by the same reference symbols.

This embodiment differs from the first embodiment only in that the synchronism detecting optical element is formed integrally with the refraction optical element of the scanning optical element by injection molding using a plastic material. Otherwise, this embodiment is substantially identical with the first embodiment in terms of configuration and optical effect. Thus, this embodiment operates like the first embodiment.

Referring to FIG. 9, reference numeral 17 denotes the integral type plastic optical element formed by injection molding and operating as synchronism detecting optical element which is an anamorphic lens and also as refraction optical element which is a toric lens. With this arrangement, any spatial interference of the synchronism detecting optical element and the refraction optical element is eliminated to make it possible to detect the scanning position at a position close to the image area and reduce the jittering phenomenon.

Note that, while the synchronism detecting optical element and the refraction optical element are integrally formed in this embodiment, the synchronism detecting optical element and the second optical element which is the cylindrical lens may alternatively formed as integral components by injection molding, using plastic as raw material. Still alternatively, the synchronism detecting optical element, the refraction optical element and the cylindrical lens may be integrally formed by injection molding, using plastic as raw material. This embodiment may be applied to a color image forming apparatus as described above by referring to the second embodiment.

What is claimed is:

1. A multibeam scanning optical apparatus comprising:
   a light source having a plurality of light beam emitting sections;
   a light deflector for deflecting a plurality of light beams emitted respectively from the plurality of light beam emitting sections of said light source;
   a scanning optical system for focusing the plurality of light beams deflected by said light deflector on a surface to be scanned; and a photodetector for controlling a timing of a start of scanning of the plurality of light beams by detecting at least one of the plurality of light beams deflected by said light deflector as at least one detection light beam, wherein the timing of the start of scanning is controlled to align the centers of scanning areas of the plurality of light beams with each other on the surface to be scanned while allowing starting points of scanning of the plurality of light beams to differ from each other when the plurality of light beams have respective wavelengths that are different from each other.

2. A multibeam scanning optical apparatus according to claim 1, further comprising:

a detection optical element for converging the at least one detection light beam and leading the at least one detection light beam to said photodetector, wherein said detection optical element has its optical surfaces arranged orthogonally relative to the at least one detection light beam.

3. A multibeam scanning optical apparatus according to claim 2, wherein said detection optical element comprises an anamorphic lens.

4. A multibeam scanning optical apparatus according to claim 2, wherein said detection optical element is made of a plastic material.

5. A multibeam scanning optical apparatus according to claim 2, wherein said scanning optical system comprises a refraction optical element and a diffraction optical element.

6. A multibeam scanning optical apparatus according to claim 5, wherein said refraction optical element and said diffraction optical element are made of a plastic material.

7. A multibeam scanning optical apparatus according to claim 6, wherein said detection optical element and said refraction optical element are integrally formed by using a plastic material.

8. A multibeam scanning optical apparatus according to claim 2, further comprising an incident optical system for leading the plurality of light beams emitted from said light source to said optical deflector.

9. A multibeam scanning optical apparatus according to claim 8, wherein said incident optical system comprises a first lens for collimating each of said plurality of light beams emitted from said light source and a second lens for focusing each of said plurality of collimated light beams on the deflection plane of the optical deflector as a linear image extending in the main-scanning direction.

10. A multibeam scanning optical apparatus according to claim 9, wherein said detection optical element and said second lens are integrally formed by using a plastic material.

11. A multibeam scanning optical apparatus according to claim 1, wherein said photodetector controls a time of a start of scanning of the plurality of light beams by detecting all of the plurality of light beams deflected by said light deflector as detection light beams.

12. A multibeam scanning optical apparatus according to claim 1, wherein the at least one detection light beam does not pass through said scanning optical system.

13. A multibeam scanning optical apparatus according to claim 12, further comprising:

an image carrier arranged on the surface to be scanned.

14. A multibeam scanning apparatus according to claim 1, wherein said photodetector and the center of a scanning width in the main scanning direction on the surface to be scanned are optically equivalent.

15. An image forming apparatus comprising:

a multibeam scanning optical apparatus as defined in any one of claims 1 to 10, 11 and 14; and an image carrier arranged on the surface to be scanned.

16. An image forming apparatus comprising:

light source means including a plurality of light beam emitting sections;

light deflector means for deflecting a plurality of light beams emitted respectively from the plurality of light beam emitting sections;

scanning optical system means for focusing the plurality of light beams deflected by said light deflector means on at least one surface to be scanned;

photodetector means for controlling a timing of a start of scanning of the plurality of light beams by detecting at least one of the plurality of light beams deflected by said light deflector means as at least one detection light beam; and at least one image carrier arranged on the at least one surface to be scanned, wherein the timing of the start of scanning is controlled to align the centers of scanning areas of the plurality of light beams with each other on the at least one surface to be scanned while allowing starting points of scanning of the plurality of light beams to differ from each other when the plurality of light beams have respective wavelengths that are different from each other.

* * * * *

UNITED STATES PATENT AND TRADEMARK OFFICE
CERTIFICATE OF CORRECTION

PATENT NO. : 6,822,666 B2
DATED : November 23, 2004
INVENTOR(S) : Manabu Kato

It is certified that error appears in the above-identified patent and that said Letters Patent is hereby corrected as shown below:

Title page,
Item [56], References Cited, U.S. PATENT DOCUMENTS, -- 5,834,766 11/1998 Suhara -- should be added.

Column 1,
Line 34, "the-recording" should read -- the recording --.

Signed and Sealed this

Tenth Day of May, 2005

JON W. DUDAS
*Director of the United States Patent and Trademark Office*